US006247217B1

(12) United States Patent
Kilgore

(10) Patent No.: US 6,247,217 B1
(45) Date of Patent: Jun. 19, 2001

(54) PULLER JAW POSITIONING CAM

(76) Inventor: Gary Hartman Kilgore, P.O. Box 460828, San Antonio, TX (US) 78246

( * ) Notice: Subject to any disclaimer, the term of this patent is extended or adjusted under 35 U.S.C. 154(b) by 0 days.

(21) Appl. No.: 09/489,118

(22) Filed: Jan. 21, 2000

(51) Int. Cl.[7] .......... B23P 19/04
(52) U.S. Cl. .......... 29/255; 29/275; 29/282
(58) Field of Search .......... 29/255, 262, 265; 279/35, 106, 114, 115, 116

(56) References Cited

U.S. PATENT DOCUMENTS 4,401,308 * 8/1983 Sakaguchi .......... 279/114
5,141,239 * 8/1992 Clay .......... 279/114
5,819,607 * 10/1998 Carnesi .......... 81/128
6,088,898 * 7/2000 Lundsten .......... 29/255

* cited by examiner

*Primary Examiner*—Joseph J. Hail, III
*Assistant Examiner*—Daniel Shanley

(57) ABSTRACT

A puller jaw positioning cam regulates the relative inclination of puller jaws on a puller assembly, typical to slide hammers. The cam has a first end and a second end. Extending through the cam from the first end to the second end is an attachment means for operating the cam about the shaft of a puller assembly. The first end of the cam provides a series of guide elements which communicate with the puller jaws. Rotation of the cam causes the inclination of the puller jaws to change relative to the shaft and each other.

1 Claim, 6 Drawing Sheets

PULLER JAW POSITIONING CAM

BACKGROUND OF THE INVENTION

1. Field of the Invention

The novelty disclosed in this document pertains to hand tools. More narrowly, it applies to puller jaw positioning means for generic jaws typically incorporated with a slide hammer.

The generic slide hammer includes a yoke and jaw assembly, along with an element, the function of which is to force the jaws together or apart, depending on the orientation of the element. This element has a threaded cavity to allow it to attach to a threaded portion of a shaft that is incorporated in the slide hammer. One end of the element has a concave surface, while the opposing end has a convex surface. The orientation of the concave and convex surfaces on the assembly determine whether the jaws will be forced together or apart by the element.

This is where an opportunity for improvement lies with this assembly. This part, which I am referring to as the element, can merely press against one surface of each jaw. It is either forcing them together or apart, it can not restrict the travel of the jaws in the direction it is forcing the jaws. Additionally, in order to convert from one function to the other, the yoke and jaw assembly and the element must be removed from the threaded shaft so that the element can be flipped over and reinstalled.

The cam disclosed in this application: eliminates the need to dismantle the assembly in order to convert from one function to the other; it is used with the inexpensive generic jaws typical to slide hammers; it provides precise control of the inclination of the jaws; and it is an inexpensive improvement which offers significant time savings in set up.

2. Description of the Related Art Including Information Disclosed Under 37 CFR 1.97 and 1.98

Examining the patent record I did not find a record of a cam for controlling the positioning of puller jaws. I did find several pullers that include jaw positioning mechanisms and submit them here. Each of these pullers are commercially available.

While each of the prior art citations provide precise control of the jaw positions, they do not meet the criteria of: reversibility without disassembly; functionality with generic puller jaws typical to slide hammers; or small cost.

Prior Art Cited

| | | | |
|---|---|---|---|
| 5,174,005 | Locking Puller Device | Somerville | 1992 |
| 5,224,254 | Puller | McPeak | 1993 |
| 5,251,368 | Internal Locking Puller | Somerville | 1993 |
| 5,557,833 | Puller Device | Pool | 1996 |

Somerville's Locking Puller Device, U.S. Pat. No. 5,174,005, is a well designed puller for gripping externally and pushing internally. It's draw backs are: it can not be reconfigured to grip internally; and it is relatively expensive to manufacture.

McPeak's Puller, U.S. Pat. No. 5,224,254, is a versatile puller, which can grip internally or externally. The primary draw back of this device, as with all pullers with which I am acquainted, is that the adjusting component is a threaded rod. While a threaded rod provides the accuracy of adjustment and strength needed, it is an extremely slow adjustment method.

Somerville's Internal Locking Puller, U.S. Pat. No. 5,251,368, has the same drawbacks as his previously mentioned Locking Puller Device. The orientation of its' jaws are not reversible and it is expensive to manufacture.

Pool's Puller Device, U.S. Pat. No. 5,557,833, is a versatile puller, similar to McPeak's Puller. As with McPeak's Puller, the significant drawback is the use of a threaded rod for adjustment.

OBJECTS AND ADVANTAGES

The objectives of the improvements disclosed in this document are: to provide a means to position puller jaws; to reduce the time necessary to effectively set up a puller assembly for use; and to do so by means of an economical device that a mechanic can incorporate with his existing tools.

The advantages offered are: precise control of the relative position of the puller jaws; elimination of disassembly to convert between outward and inward forcing functions; inexpensive cost; and usefulness with existing slide hammers.

BRIEF SUMMARY OF THE INVENTION

The improvement found in this puller jaw positioning device pertains to restricting the travel of puller jaws within desired parameters.

The improvement disclosed in this document is a cam configuration for manipulation of the jaws of a generic puller assembly typically incorporated with a slide hammer. The benefit provided by this element is the ability to selectively expand or contract the work engaging structures of the jaws by rotating the cam.

Additional benefits of this improvement are: ease of operation, decreased setup time, and inexpensive cost.

OPERATION

The puller jaw positioning cam disclosed in this application is used in conjunction with a puller assembly incorporating: a shaft that includes a threaded segment; and a yoke and jaw assembly that attaches to the threaded segment of the shaft. Each jaw has a first work engaging end and a second end.

The puller jaw positioning cam is attached to the threaded segment of the shaft prior to installation of the yoke and jaw assembly. With the first work engaging ends of the jaws oriented outward facing from the puller assembly, the second ends of the jaws face and engage the grooves in the cam.

Rotation of the cam causes the location of the first work engaging ends of the jaws to change position relative to the axis of the shaft. Consequently, the work engaging ends of the jaws may engage and disengage work in response to the rotation of the cam.

REFERENCE NUMERIALS IN DRAWINGS

Figure 1:
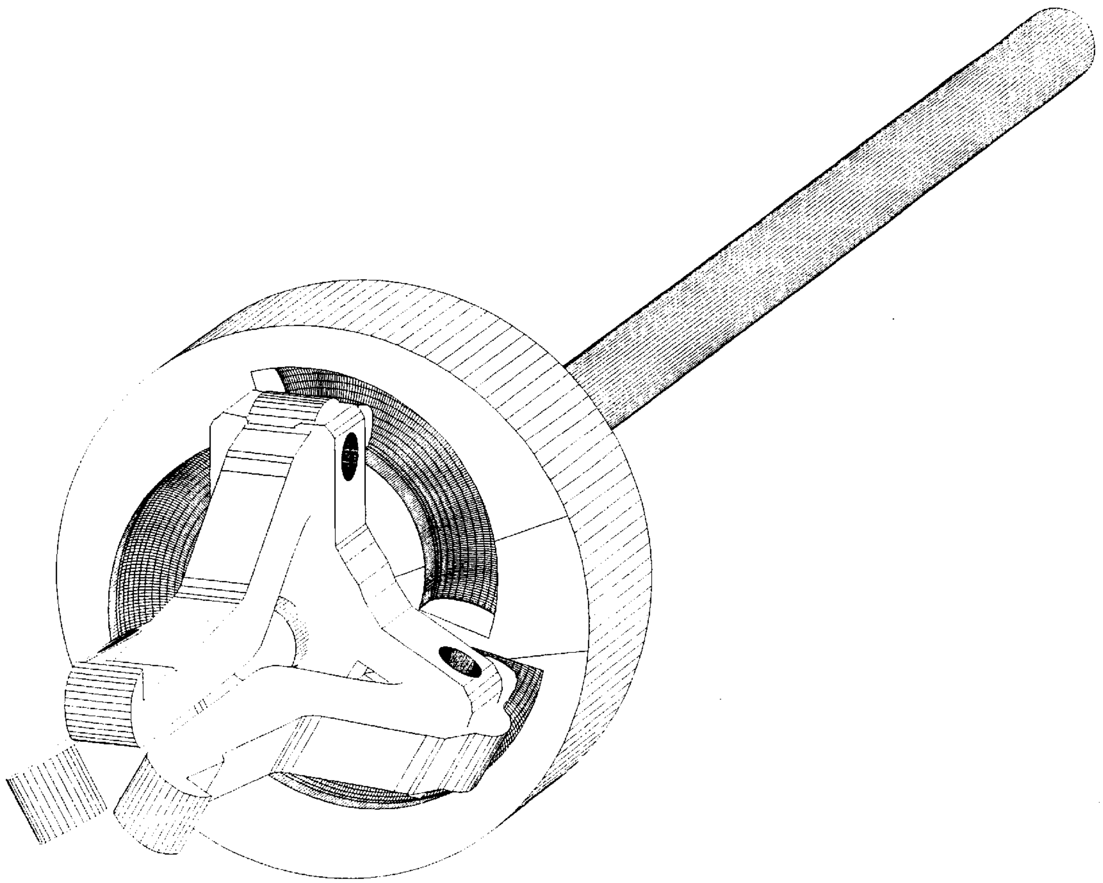
FIG. 1 illustration of a puller and cam assembly with the puller jaws in a retracted position.
Figure 2:
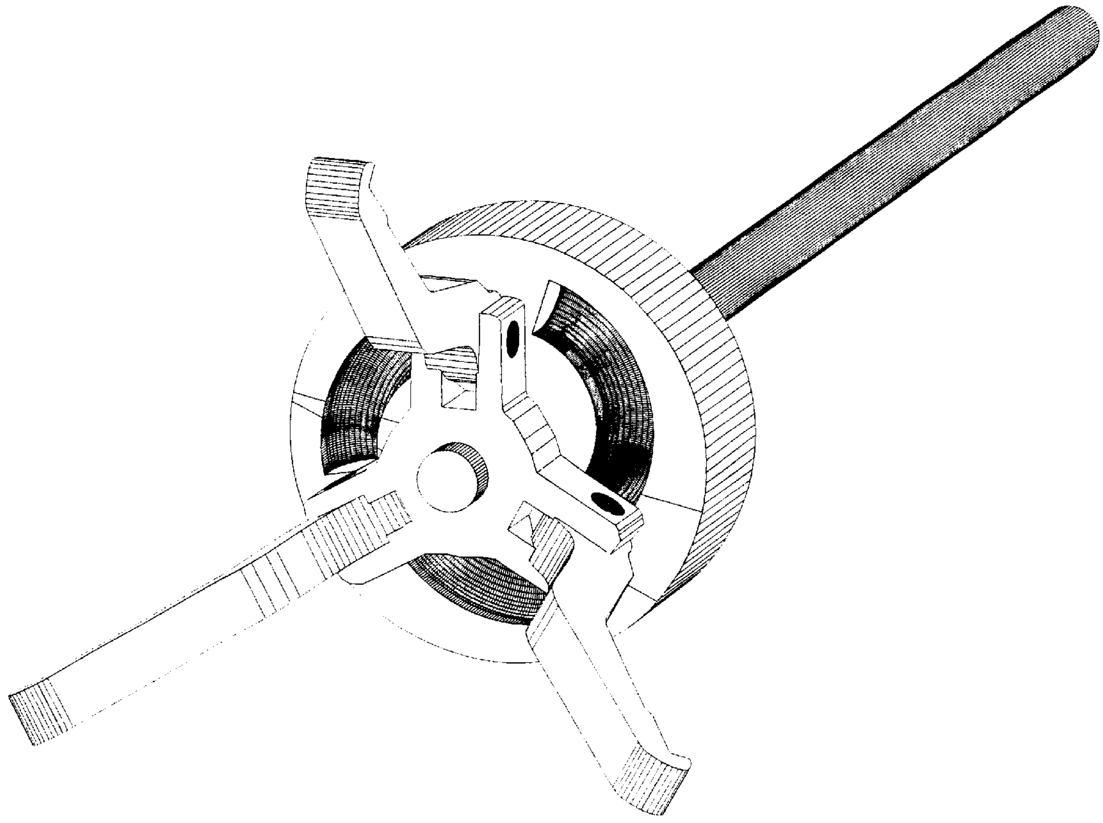
FIG. 2 illustration of a puller and cam assembly with the puller jaws in an expanded position.
Figure 3:
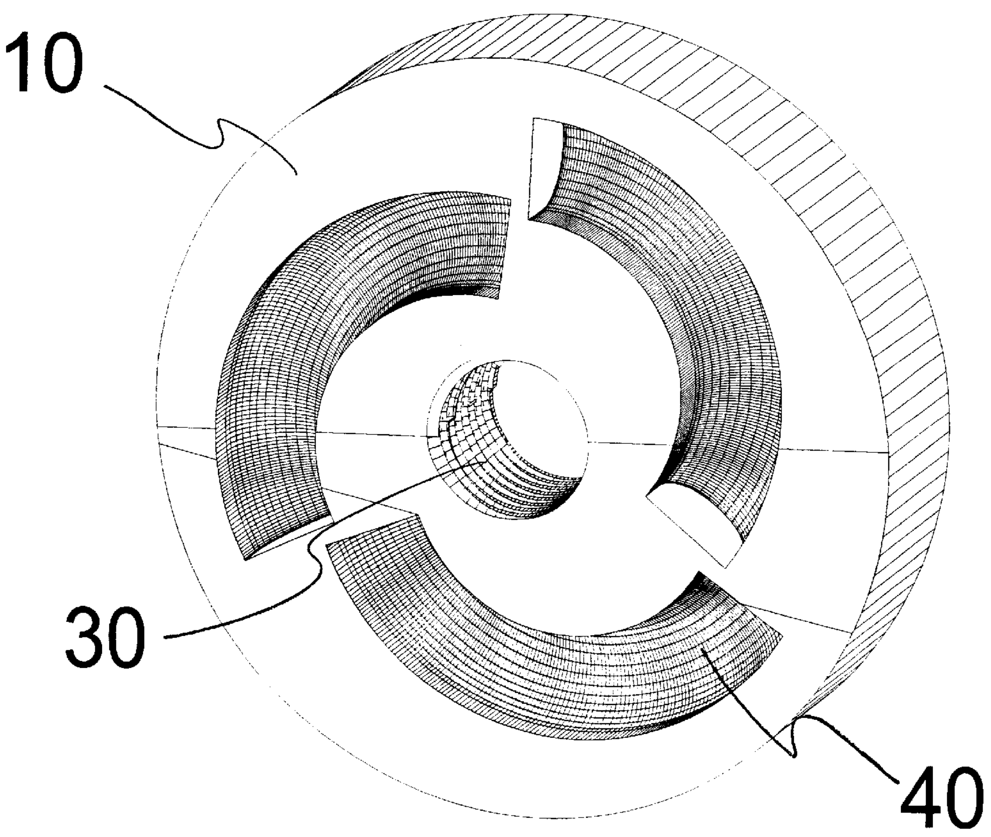
FIG. 3 illustration of a first end 10 of a puller jaw positioning cam; attachment means 30; and guide elements 40.
Figure 4:
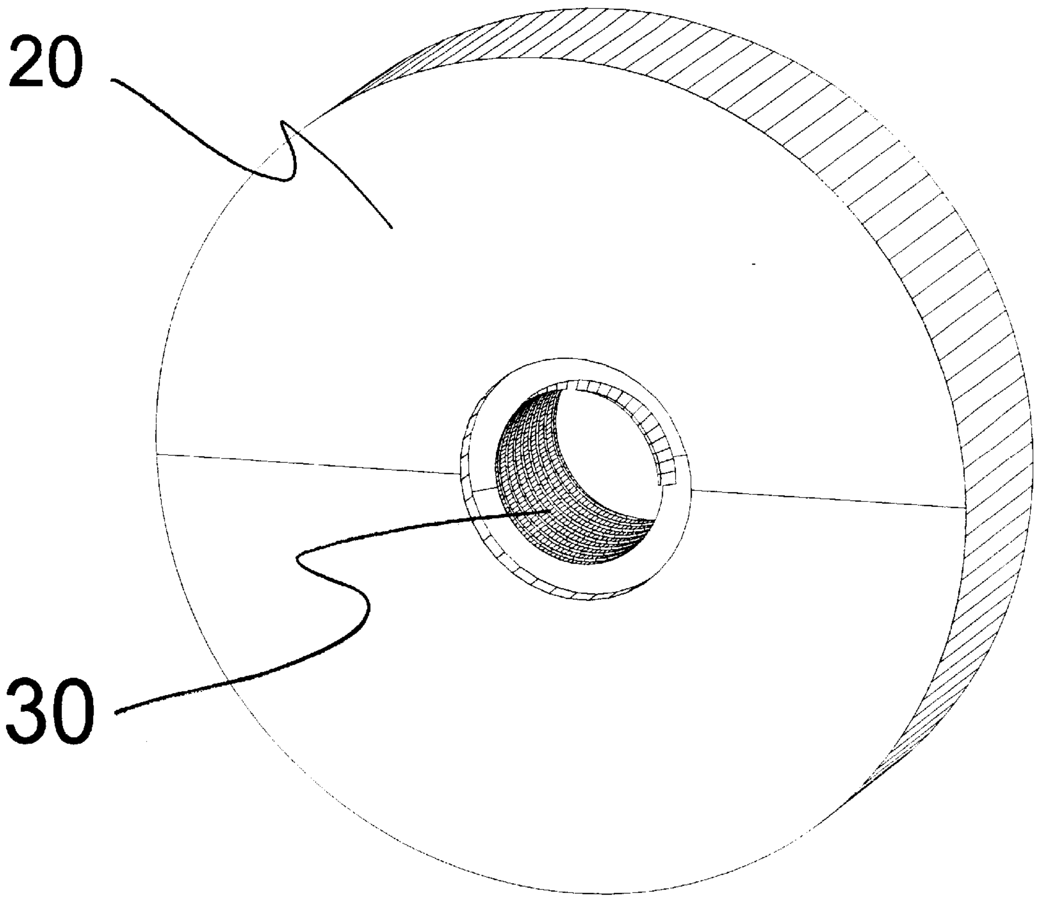
FIG. 4 illustration of a second end 20 of a puller jaw positioning cam; and attachment means 30.
Figure 5:
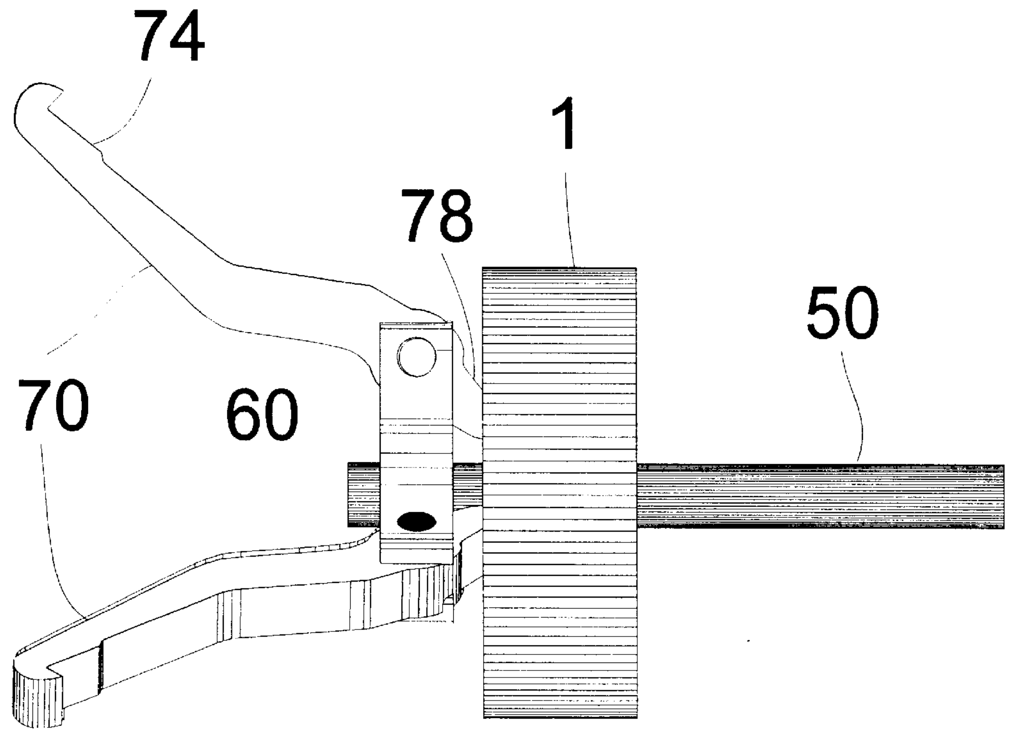
FIG. 5 illustration of a side view of a puller and cam assembly, showing: cam 1; puller shaft 50; puller yoke 60; puller jaws 70; puller jaw first work engaging end 74; and puller jaw second end 78.
Figure 6:
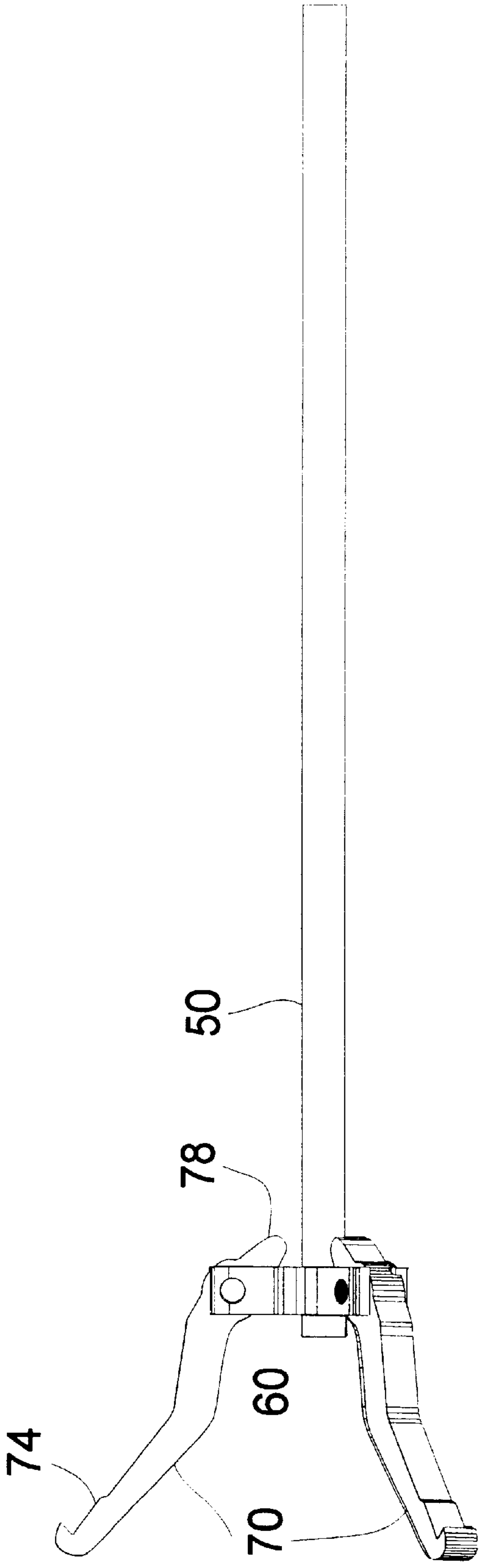
FIG. 6 illustration of a side view of a puller which is typically incorporated with a slide hammer, showing: puller shaft 50; puller yoke 60; puller jaws 70; puller jaw first work engaging end 74; puller jaw second end 78.

1—cam
10—first end of cam
20—second end of cam
30—attachment means
40—guide elements
50—puller shaft
60—puller yoke
70—puller jaw
74—puller jaw first work engaging end
78—puller jaw second end

DETAILED DESCRIPTION OF THE INVENTION

The puller jaw positioning cam 1 illustrated according to the invention is shown to have a first end 10 and a second end 20. An attachment means 30 is provided to operate the cam about a shaft of a puller assembly. The first end 10 is provided with a series of guide elements 40, which are configured to engage the second end 78 of the puller jaws 70 of the puller assembly. The surface features 40 provide tracks for the puller jaws, and consequently, regulate the relative inclination of the puller jaws on the puller assembly.

I claim:

1. A hand-held puller assembly tool for removing a workpiece comprising:

an elongated puller shaft having a forward end, an intermediate threaded portion, a rear end, and a longitudinal axis connecting said ends;

an annular cam body having a first surface, a second surface, and attachment means at a hollow center interior of the cam, said cam surfaces being substantially located at right angles to the longitudinal axis;

said attachment means operatively connected to said intermediate threaded portion of said puller shaft for rotatably positioning said cam along the longitudinal axis of the puller shaft;

a plurality of recesses on the first cam surface having guide elements;

a yoke fixedly attached to said forward end of puller shaft having a series of detachably connected jaw members, the jaw members having first and second ends, cam following means for engagement with the cam guide elements and for positioning the relative inclination of the jaw members, whereby rotation of said cam body in a clockwise direction about the longitudinal axis moves said jaw members outwardly; and in a counterclockwise direction inwardly; each guide element having a length and a orientation configured to confine the travel of the second end of the puller jaw to a predetermined limit;

said puller jaw member detachably connected to the yoke member by a pin means;

a slide hammer located at the rear end of the puller shaft having an impact member for forcing the puller tool in a direction along the longitudinal axis.

* * * * *

UNITED STATES PATENT AND TRADEMARK OFFICE

CERTIFICATE OF CORRECTION

PATENT NO. : 6,247,217 B1
DATED : June 19, 2001
INVENTOR(S) : Gary Hartman Kilgore It is certified that error appears in the above-identified patent and that said Letters Patent is hereby corrected as shown below:

Column 4,
Lines 1-35, entire claim removed and replaced with:

1. A cam for positioning a relative inclination of puller jaw members on a hand held puller assembly of a type comprising: an elongated puller shaft having a first end and a second end, an intermediate threaded portion, and a longitudinal axis connecting said ends; a yoke member fixedly attached to said first end of puller shaft having a series of detachably connected puller jaw members, each puller jaw member having a first end and a second end; said puller jaw members detachably connected to the yoke member by a pin means; and a slide hammer located at the second end of the elongated puller shaft having an impact member for forcing the puller assembly in a direction along the longitudinal axis:
   said cam comprising: a first end and a second end; extending through the cam from the first end to the second end is an attachment means which communicates with the intermediate threaded portion of the elongated puller shaft of the puller assembly; said first end of the cam is provided with a series of guide elements, each of said guide elements is configured to communicate with the second end of a puller jaw member on the puller assembly, confining the travel of the second end of each puller jaw to a limit imposed by each guide element length and orientation.

Signed and Sealed this

Twenty-second Day of October, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,247,217 B1
DATED : June 19, 2001
INVENTOR(S) : Gary Hartman Kilgore It is certified that error appears in the above-identified patent and that said Letters Patent is hereby corrected as shown below:

Column 4,
Lines 1-35, entire claim removed and replaced with:

1. A cam for positioning a relative inclination of puller jaw members on a hand held puller assembly of a type comprising: an elongated puller shaft having a first end and a second end, an intermediate threaded portion, and a longitudinal axis connecting said ends; a yoke member fixedly attached to said first end of puller shaft having a series of detachably connected puller jaw members, each puller jaw member having a first end and a second end; said puller jaw members detachably connected to the yoke member by a pin means; and a slide hammer located at the second end of the elongated puller shaft having an impact member for forcing the puller assembly in a direction along the longitudinal axis:

said cam comprising: a first end and a second end; extending through the cam from the first end to the second end is an attachment means which communicates with the intermediate threaded portion of the elongated puller shaft of the puller assembly; said first end of the cam is provided with a series of guide elements, each of said guide elements is configured to communicate with the second end of a puller jaw member on the puller assembly, confining the travel of the second end of each puller jaw to a limit imposed by each guide element length and orientation.

Signed and Sealed this

Twenty-ninth Day of October, 2002

*Attest:*

JAMES E. ROGAN

*Attesting Officer*

*Director of the United States Patent and Trademark Office*